(12) United States Patent
Morrison

(10) Patent No.: US 12,740,514 B2
(45) Date of Patent: Sep. 22, 2026

(54) GRAIN PROCESSING APPARATUS OF A COMBINE HARVESTER AND CONTROLLABLE RELEASE PASSAGE THEREFOR

(71) Applicant: AGCO International GmbH, Neuhausen (CH)

(72) Inventor: Alastair Cameron Morrison, Randers (DK)

(73) Assignee: AGCO International GmbH, Neuhausen (CH)

( * ) Notice: Subject to any disclaimer, the term of this patent is extended or adjusted under 35 U.S.C. 154(b) by 339 days.

(21) Appl. No.: 18/532,213

(22) Filed: Dec. 7, 2023

(65) Prior Publication Data

US 2024/0196801 A1 Jun. 20, 2024

(51) Int. Cl.
*A01F 12/44* (2006.01)
*A01D 41/127* (2006.01)

(52) U.S. Cl.
CPC ........ *A01F 12/446* (2013.01); *A01D 41/1276* (2013.01)

(58) Field of Classification Search
CPC ...... A01F 12/44; A01F 12/446; A01F 12/448; A01D 41/1276; A01D 12/1277
See application file for complete search history.

(56) References Cited

U.S. PATENT DOCUMENTS 3,603,063 A * 9/1971 Stroburg ............... A01F 12/444 460/109
8,968,065 B2 3/2015 Bilde
9,986,688 B2 * 6/2018 Stahl ......................... A01F 7/06
10,939,618 B2 3/2021 During et al.
2001/0002366 A1 * 5/2001 Visagie ................... A01F 12/44 460/44
2001/0002367 A1 * 5/2001 Visagie ................... A01F 12/44 460/4
2001/0029199 A1 * 10/2001 Visagie ................... A01F 12/44 460/84
2002/0037758 A1 * 3/2002 Visagie ................. A01F 12/444 460/99
2013/0157731 A1 * 6/2013 Biggerstaff ........... A01F 12/444 460/1
2014/0080554 A1 * 3/2014 Bilde ........................ A01F 7/04 460/73
2018/0110184 A1 * 4/2018 During .................... A01F 12/46
2019/0059233 A1 * 2/2019 Bilde .................... A01F 12/446
2020/0137959 A1 * 5/2020 Ricketts .................. A01F 12/00

FOREIGN PATENT DOCUMENTS

DE 3720696 C1 7/1988
GB 2354692 A 4/2001

OTHER PUBLICATIONS

UK Intellectual Property Office, Search Report for GB Application No. GB2219217.3, dated Jun. 19, 2023, 3 pages.

* cited by examiner

*Primary Examiner* — Christopher J Sebesta
*Assistant Examiner* — Julia C Tran

(57) ABSTRACT

A grain processing apparatus for a combine harvester has a return pan with a release passage for releasing the harvested crop material before it reaches a grain cleaning system, and a controllable closure for opening and closing the release passage. Thus, the amount of MOG to be processed by the grain cleaning system can be controlled.

11 Claims, 3 Drawing Sheets

GRAIN PROCESSING APPARATUS OF A COMBINE HARVESTER AND CONTROLLABLE RELEASE PASSAGE THEREFOR

FIELD

Embodiments of the present disclosure relate generally to combine harvesters, and in particular to the grain separating and grain cleaning system of the combine harvester.

BACKGROUND

A combine harvester typically includes a threshing system for detaching grains of cereal from the ears of cereal, a separating apparatus downstream of the threshing system, and a grain cleaning apparatus for receiving grain from the separating apparatus. A stratification pan between the separating apparatus and the grain cleaning apparatus aims to stratify the material into a layered structure of grain at the bottom and light chaff and other material other than grain (MOG) at the top.

There are various designs for the threshing system and for the separating apparatus (e.g. axial or transverse) as well as for the grain cleaning apparatus. However, in all designs, there is a flow of material from the threshing system to the separating apparatus, and between the separating apparatus and the grain cleaning unit, in particular from the stratification pan to the grain cleaning unit. The flow can either pass from the stratification pan directly to the grain cleaning unit or there may an intermediate cascade pan between the stratification pan and the grain cleaning unit.

The threshing system typically comprises threshing rotors that rotate with respect to concave gratings (known simply as "concaves"). As mentioned above, the threshing rotors may be arranged transversally or longitudinally with respect to the direction of travel of the combine harvester. The distance between the concaves and the rotors is adjustable, so that the threshing system may be configured for different crop types and harvesting conditions.

For good performance, a combine should separate sufficient grain but not separate too much MOG into the cleaning system. However, there is a compromise between the effectiveness of the separation of grain and the amount of MOG which has to be processed by the cleaning system. A preferred balance may depend on the harvesting conditions.

There is therefore a need for a system that enables simple adjustment of a setting of the grain processing system.

BRIEF SUMMARY

The invention is defined by the claims. According to examples in accordance with a first aspect of the invention, there is provided a grain processing apparatus for a combine harvester, comprising a threshing system, a separating system downstream of the threshing system, and a return pan for receiving harvested crop material from the separating system and for delivering the harvested crop material to a grain cleaning system. The return pan comprises a release passage for releasing the harvested crop material before it reaches the grain cleaning system, and a controllable closure for opening and closing the release passage.

This system may enable the flow of material from a separating system back to the cleaning system of a combine harvester to be interrupted, and discharged. This reduces the amount of MOG reaching the cleaning system for times when it is becoming clogged with MOG. If, instead, additional MOG can be accepted, to improve the effectiveness of seed separation, the release passage can be closed.

In one set of examples, the threshing system and the separating system comprise an axial flow system. Thus, the invention may be applied to an axial combine.

In another set of examples, the threshing system comprises at least one tangential flow rotor and associated concave. The separating system for example comprises an axial flow rotor. Thus, the grain processing is for example for use in a hybrid machine. The invention may also be applied to a straw walker combine for straw walker designs which incorporate a return pan.

The grain processing apparatus may further comprise an actuator for controlling the controllable closure. Thus, a manually adjusted system is possible, but the use of an actuator enables automated control. A controller may then be provided for driving the actuator.

The grain processing apparatus may then comprise a sensor arrangement for sensing a separation effectiveness, wherein the controller is configured to control the actuator in dependence on the separation effectiveness. Thus, the discharge function is controlled to maintain a desired overall separation effectiveness by increasing the flow to the cleaning apparatus if the separation has low effectiveness.

The grain processing apparatus may also (or instead) comprise a sensor arrangement for sensing a parameter indicative of a level of MOG presence in a grain cleaning system, wherein the controller is configured to control the actuator in dependence on the level of MOG presence. Thus, the discharge function is controlled to prevent blockage in the cleaning apparatus.

In both cases, the system avoids too much MOG being separated into the cleaning shoe. This will lead to high cleaning shoe losses.

Another option is to use a sensor to measure the cleaning loss versus the processor loss and control the actuator in dependent on the balance between the two.

The grain processing apparatus for example further comprises the grain cleaning system, which may comprise a stratification pan for receiving the harvested crop material from a front end of the return pan and from the threshing system, a sieve arrangement for receiving the harvested crop material from a rear end of the stratification pan, and a fan for providing an air flow to an area between a rear end of the stratification pan and the sieve arrangement.

The sieve arrangement for example comprises a chaffer sieve for conveying harvested crop material in a generally rearward direction, and a lower sieve, and wherein the grain cleaning apparatus comprises a clean grain chute below the lower sieve.

The grain cleaning system for example further comprises a second chute for directing tailings to a tailings collection trough.

The grain cleaning system for example further comprises a cascade pan between the stratification pan and the sieve arrangement. This may be used to further assist separation of the grain and MOG.

The invention also provides a combine harvester comprising a crop cutting head, and the grain processing apparatus as defined above.

BRIEF DESCRIPTION OF THE DRAWINGS

One or more embodiments of the invention/disclosure will now be described, by way of example only, with reference to the accompanying drawings, in which.

DETAILED DESCRIPTION

Figure 1:
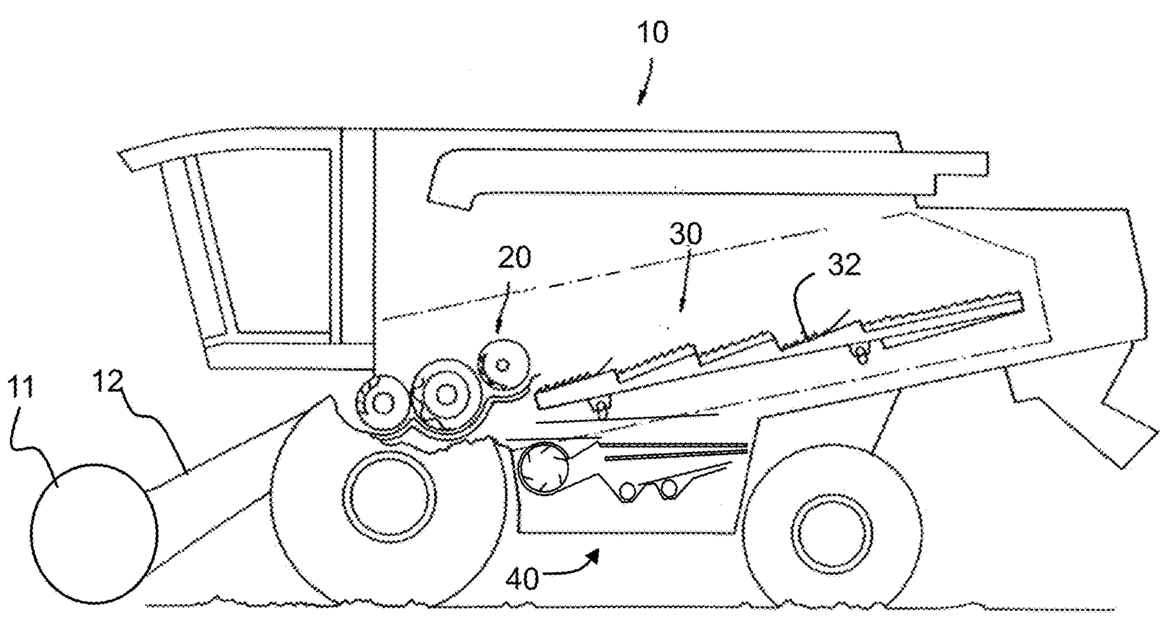
FIG. 1 shows a combine harvester which may be adapted in accordance with the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

This disclosure in relates to a grain processing apparatus for a combine harvester in which a return pan has a release passage for releasing the harvested crop material before it reaches a grain cleaning system, and a controllable closure for opening and closing the release passage. Thus, the amount of MOG to be processed by the grain cleaning system can be controlled.

FIG. 1 shows a known combine harvester 10 to which the invention may be applied. A crop cutting head 11 (known as the header) for example comprises a wide laterally extending transverse auger, which cuts the crop material and drives it inwardly towards a central area. A front elevator housing 12 receives the cut crop material and includes a feederhouse for transporting the crop material.

The feederhouse delivers the crop material to a threshing system 20 for detaching grains of cereal from the ears of cereal, and a separating apparatus 30 which is connected downstream of the threshing system 20. The threshing system comprises one or more threshing units, in particular rotors, and associated concaves.

In the example shown, the separating apparatus 30 includes a plurality of parallel, longitudinally-aligned, straw walkers 32, and this is suitable for the case of a so-called straw-walker combine. The grains after separation by the separating device 30 pass to a grain cleaning apparatus 40.

In the example shown, the threshing system 20 is a tangential-flow ‘conventional’ threshing system, i.e. formed by rotating elements with an axis of rotation in the side-to-side direction of the combine harvester and for generating a tangential flow. For example, the ‘conventional’ threshing system includes a rotating, tangential-flow, threshing cylinder and a concave-shaped grate. The threshing cylinder includes rasp bars (not shown) which act upon the crop stream to thresh the grain or seeds from the remaining material, the majority of the threshed grain passing through the underlying grate and onto a stratification pan (also sometimes known as the grain pan).

There are also axial threshing systems, i.e. formed by rotating elements with an axis of rotation in the longitudinal direction (direction of travel). For example, the threshing section may have axially-aligned rasp bars spaced around the front section whilst the separating section has separating elements or fingers arranged in a pattern, e.g. a spiral pattern, extending from the rasp bars to the rear of the rotor.

Figure 2:
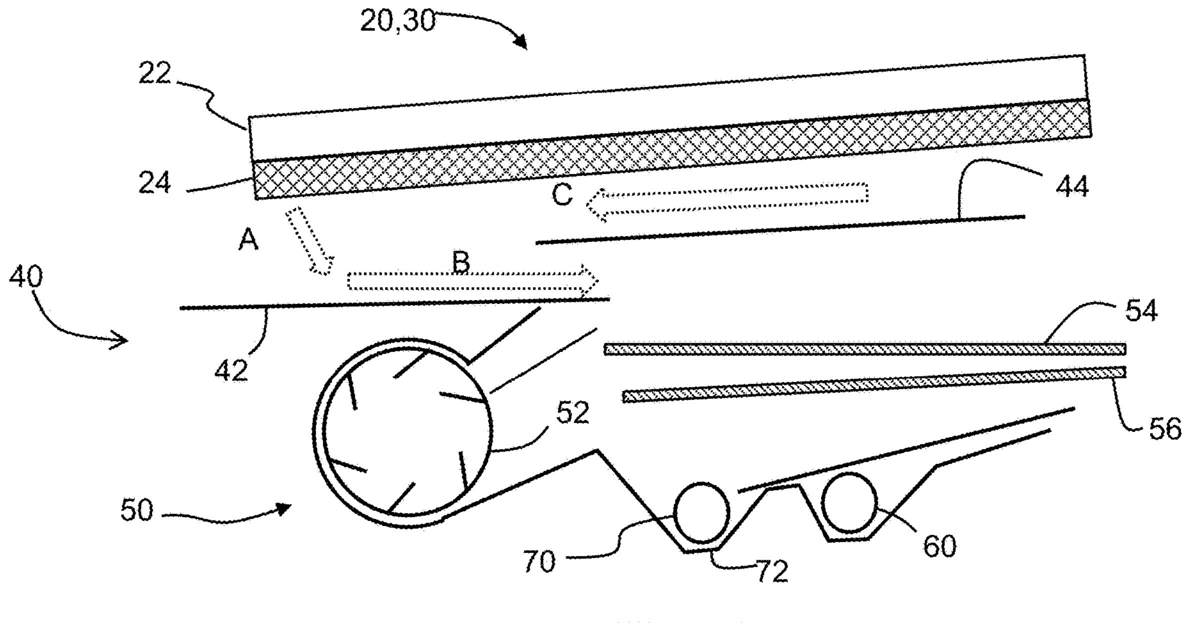
FIG. 2 shows one example of threshing system and grain cleaning apparatus in more detail.

An axial threshing and separating system 20,30 is shown in FIG. 2, together with a cleaning apparatus 40.

The threshing and separating system 20,30 comprises an axial rotor 22 beneath which is mounted the concave 24. The concave may have different sections along its length, and the first section to receive the crop material (to the left in FIG. 2) may have a releasable concave, or else the whole length of the concave may be releasable. The separating function involves conveying the crop stream rearwardly in a ribbon passing along a spiral path.

The initial threshing creates a flow of grain to a stratification pan 42. The separating function further downstream of the threshing and separating system serves to separate further grain from the crop stream and this separated grain passes through a grate-like structure onto an underlying return pan 44. The residue crop material, predominantly made up of straw, exits the machine at the rear. Although not shown in FIG. 1, a straw spreader and/or chopper may be provided to process the straw material as required.

The threshing and separating apparatus 20 does not remove all material other than grain, “MOG”, from the grain so that the crop stream collected by the stratification pan 42 and return pan 44 typically includes a proportion of straw, chaff, tailings and other unwanted material such as weed seeds, bugs, and tree twigs. The remainder of the grain cleaning apparatus 40 is in the form of a grain cleaning unit 50. The grain cleaning unit 50 removes this unwanted material thus leaving a clean sample of grain to be delivered to the tank.

The grain cleaning unit 50 comprises a fan unit 52 and sieves 54 and 56. The upper sieve 54 is known as the chaffer.

The stratification pan 42 and return pan 44 are driven in an oscillating manner to convey the grain and MOG accordingly. Although the drive and mounting mechanisms for the stratification pan 42 and return pan 44 are not shown, it should be appreciated that this aspect is well known in the art of combine harvesters and is not critical to disclosure of the invention. Furthermore, it should be appreciated that the two pans 42, 44 may take a ridged construction as is known in the art.

The general flow of material is as follows. The grain passing through the concave 24 falls onto the front of stratification pan 42 as indicated by arrow A in FIG. 2. This material is conveyed rearwardly (in the direction of arrow B in FIG. 2) by the oscillating motion of the stratification pan 42 and the ridged construction thereof. Material passing through the concave further back falls onto the return pan 44 and is conveyed forwardly by the oscillating motion and ridged construction thereof as shown by arrow C.

It is noted that “forwardly” and “rearwardly” refer to direction relative to the normal forward direction of travel of the combine harvester.

When the material reaches a front edge of the return pan 44 it falls onto the stratification pan 42 and is conveyed as indicated by arrow B.

The combined crop streams thus progress rearwardly towards a rear edge of the stratification pan 42. Whilst conveyed across the stratification pan 42, the crop stream, including grain and MOG, undergoes stratification wherein the heavier grain sinks to the bottom layers adjacent stratification pan 42 and the lighter and/or larger MOG rises to the top layers.

Upon reaching the rear edge of the stratification pan 42, the crop stream falls onto the chaffer 54 which is also driven in a fore-and-aft oscillating motion. The chaffer 54 is of a known construction and includes a series of transverse ribs or louvers which create open channels or gaps therebetween. The chaffer ribs are angled upwardly and rearwardly so as to encourage MOG rearwardly whilst allowing the heavier grain to pass through the chaffer onto an underlying second sieve 56.

The chaffer 54 is coarser (with larger holes) than second sieve 56. Grain passing through chaffer 54 is incident on the lower sieve 56 which is also driven in an oscillating manner and serves to remove tailings from the stream of grain before being conveyed to on-board tank (not shown) by grain collecting auger 70 which resides in a transverse trough 72 at the bottom of the grain cleaning unit 50. Tailings blocked by sieve 56 are conveyed rearwardly by the oscillating motion thereof to a rear edge from where the tailings are directed to the returns auger 60 for reprocessing in a known manner.

This disclosure relates to the design of the separating system, and in particular it relates to a function for discharging some of the returned crop material shown by arrow C to prevent it from being delivered to the cleaning system 50 by the return pan 44.

Figure 3:
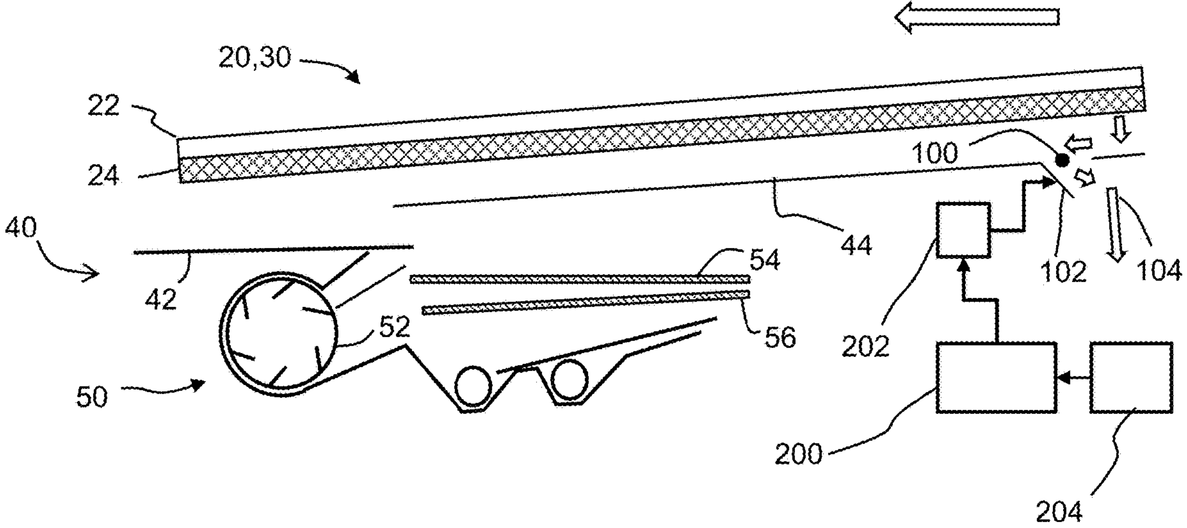
FIG. 3 shows the shows a modification to the grain cleaning apparatus in schematic form.

FIG. 3 shows a modification to the return pan 44 in which a controllable release passage 100 is provided. The release passage can be opened or closed by a closure 102. The closure may be operated automatically (using an actuator such as an electric or hydraulic actuator) or manually.

The release passage functions as a trap door. It is at the rear section of the return pan 44 so that the material discharged from the release passage does not reach the grain cleaning system, but is discharged as waste MOG product, as shown by arrows 104. The release is used when there is too much MOG in the grain cleaning system. If there is inadequate grain separation at the threshing rotor, so that there is still a significant amount of grain in the material reaching the release opening, the release opening is instead closed.

Thus a compromise may be set between processing more material to separate more grain and preventing too much MOG passing through the grain cleaning system.

In one example, the closure 102 is manually operated. However, FIG. 3 also shows that for an automated example, a controller 200 and an actuator 202 are provided for controlling the closure 102. The actuator may be an electric or hydraulic actuator for opening and closing the release passage or passages.

There may be a single release opening or multiple release openings at different locations along the fore-aft length of the return pan or indeed at different locations across the width of the return pan. One release opening may extend substantially across the full width of the return pan or there may be a series of openings. When multiple release openings are provided, there may be independent control of the closures. For example, the MOG from a selectable (final) length of the return pan may be chosen for discharge. The amount of material to discharge may also be controlled in a time modulation manner, with sequential opening and closing of the release passage or passages.

When a controller is used for automated control, the controller receives sensor information representative of the amount of MOG at the cleaning shoe and/or a separating efficiency of the threshing and separating system. A sensor arrangement for this purpose is shown as 204 in FIG. 3. By way of example, loss sensors may be used for the grain cleaning shoe (i.e. measuring cleaning losses) and the for the overall processing (i.e. processing losses), as well as a tailings volume sensor and a tailings grain sensor. These losses can be measured using known acoustic sensors. A tailings volume sensor is for example a known ultrasonic sensor. These sensors are used to measure one or more parameters which are indicative of the amount of MOG being provided by the return pan to the cleaning system, in particular to prevent that too much MOG is separated into the cleaning shoe.

Figure 4:
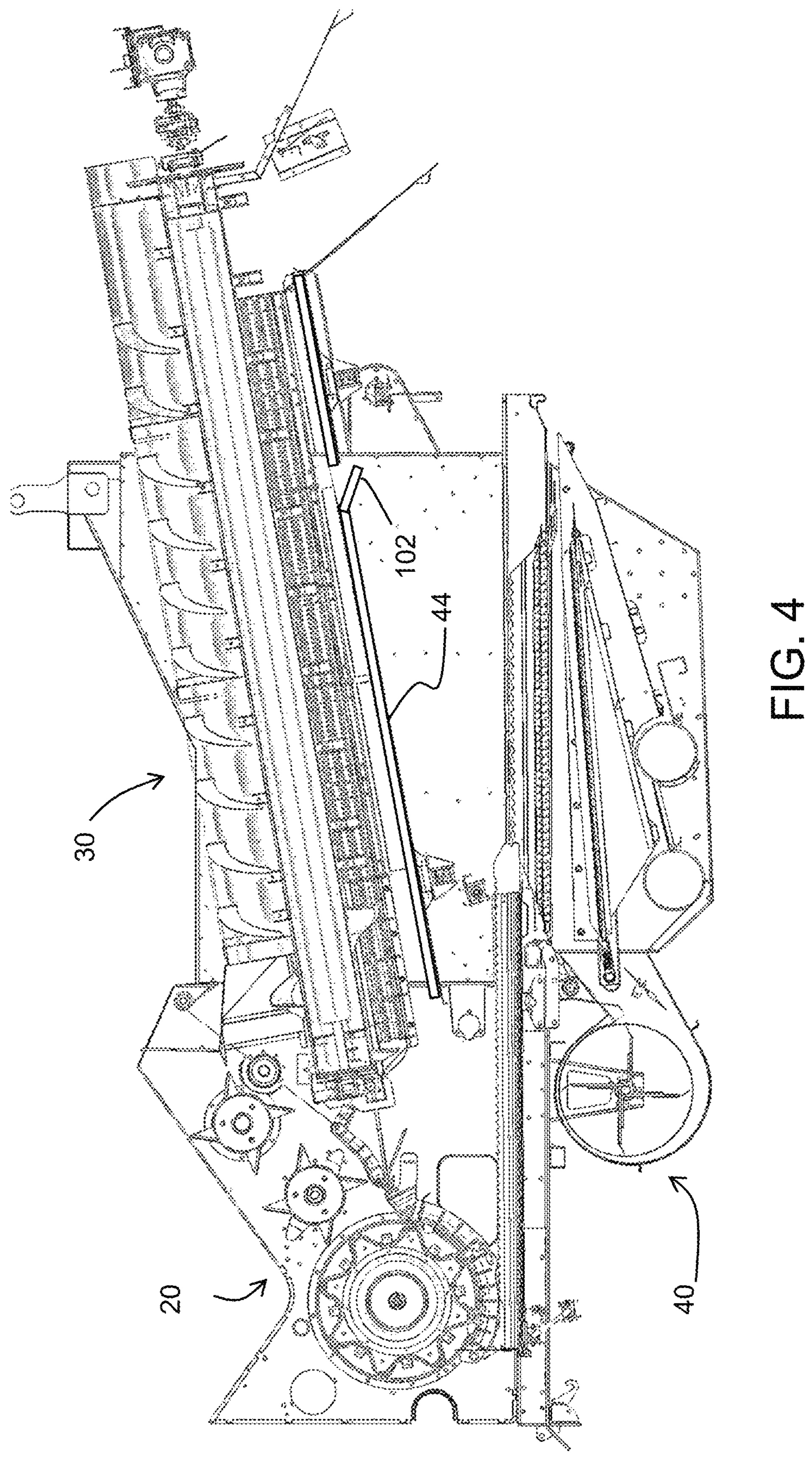
FIG. 4 shows a more detailed representation of the grain cleaning apparatus of FIG. 3.

FIG. 4 shows the grain processing system in more detail, and shows an example of a hybrid combine, with a conventional transverse flow threshing system 20 combined with an axial separation system 30.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

Any reference signs in the claims should not be construed as limiting the scope.

All references cited herein are incorporated herein in their entireties. If there is a conflict between definitions herein and in an incorporated reference, the definition herein shall control.

What is claimed is:

1. A grain processing apparatus for a combine harvester, comprising:
- a threshing system;
- a separating system downstream of the threshing system; and
- a return pan for receiving harvested crop material from the separating system and for delivering the harvested crop material to a grain cleaning system, wherein the return pan comprises an opening therein forming a release passage for releasing the harvested crop material before it reaches the grain cleaning system, and
- a door moveable between an open condition and a closed condition such that the door forms a controllable closure for opening and closing the release passage, wherein in the open condition the harvested crop material is discharged through the release passage such that harvested crop material does not reach the grain cleaning system; and
- an actuator for moving the door between the open condition and the closed condition.

2. The grain processing apparatus of claim 1, wherein the threshing system and the separating system comprise an axial flow system.

3. The grain processing apparatus of claim 1, wherein the threshing system comprises at least one tangential flow rotor and associated concave.

4. The grain processing apparatus of claim 3, wherein the separating system comprises an axial flow rotor.

5. The grain processing apparatus of claim 1, further comprising a controller for driving the actuator.

6. The grain processing apparatus of claim 5, comprising a sensor arrangement for sensing a separation effectiveness, wherein the controller is configured to control the actuator in dependence on the separation effectiveness.

7. The grain processing apparatus of claim 5, comprising a sensor arrangement for sensing a parameter indicative of a level of MOG presence in a grain cleaning system, wherein the controller is configured to control the actuator in dependence on the level of MOG presence.

8. The grain processing apparatus of claim 1, further comprising a grain cleaning system comprising:

a stratification pan for receiving the harvested crop material from a front end of the return pan and from the threshing system;

a sieve arrangement for receiving the harvested crop material from a rear end of the stratification pan; and a fan for providing an air flow to an area between a rear end of the stratification pan and the sieve arrangement.

9. The grain processing apparatus system of claim 8, wherein the sieve arrangement comprises:

a chaffer sieve for conveying harvested crop material in a generally rearward direction; and a lower sieve, and wherein the grain cleaning apparatus comprises a clean grain chute below the lower sieve.

10. The grain processing apparatus of claim 9, wherein the grain cleaning system further comprises a second chute for directing tailings to a tailings collection trough.

11. A combine harvester comprising:

a crop cutting head; and the grain processing apparatus of claim 1 for receiving the cut crop material.

* * * * *